(12) United States Patent
Tiberg et al.

(10) Patent No.: US 12,717,573 B2
(45) Date of Patent: Aug. 25, 2026

(54) MOBILE APPLICATION CLONING

(71) Applicant: DEMOSTACK INC., San Francisco, CA (US)

(72) Inventors: Gonen Tiberg, Tel Aviv (IL); Aaron Bar Hakim, Rishon LeZion (IL); Ben Sterenson, Ra'anana (IL); Gilad Avidan, Tel Aviv (IL); Yehonatan Ernest Friedman, San Francisco, CA (US)

(73) Assignee: Demostack, Inc., San Francisco, CA (US)

( * ) Notice: Subject to any disclaimer, the term of this patent is extended or adjusted under 35 U.S.C. 154(b) by 695 days.

(21) Appl. No.: 18/176,499

(22) Filed: Mar. 1, 2023

(65) Prior Publication Data

US 2024/0296043 A1 Sep. 5, 2024

(51) Int. Cl.
*G06F 9/44* (2018.01)
*G06F 8/65* (2018.01)
*G06F 8/71* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS 5,548,724 A 8/1996 Akizawa et al.
6,587,844 B1 7/2003 Mohri
6,608,634 B1 8/2003 Sherrard et al.
7,139,978 B2 11/2006 Rojewski et al.
8,108,490 B2 1/2012 Guo
8,332,637 B2 12/2012 Relyea
8,433,733 B2 4/2013 Sayed et al.
8,543,675 B1 9/2013 Yiu et al.
(Continued)

FOREIGN PATENT DOCUMENTS

CN 103595824 A 10/2013
CN 103685138 A 3/2014
(Continued)

OTHER PUBLICATIONS

CN-112882953-A (Year: 2021).*
(Continued)

*Primary Examiner* — Insun Kang
(74) *Attorney, Agent, or Firm* — Meitar Patents LTD.; Daniel Kligler

(57) ABSTRACT

A method for demonstrating an application, including receiving code of the target application, performing modifications to the code so as to generate recorder and viewer versions of the application. While using the recorder version of the target application, a set of first requests submitted by the recorder version of the target application and respective responses to the first requests are detected and stored to a file. Upon detecting, while using the viewer version of the target application, a second request submitted by the viewer version of the target application matching a given first request in the set, a respective response to the given first request is retrieved from the file, and in response to the second request, the retrieved response is conveyed to the viewer version of the target application.

23 Claims, 5 Drawing Sheets

(56) References Cited

U.S. PATENT DOCUMENTS

| | | | |
|---|---|---|---|
| 9,237,204 B1 | 1/2016 | Martini et al. | |
| 10,659,566 B1 * | 5/2020 | Luah | G06F 11/3414 |
| 10,754,713 B1 | 8/2020 | Witthawaskul et al. | |
| 10,788,957 B1 | 9/2020 | Lenzner | |
| 11,570,238 B2 | 1/2023 | Mohan et al. | |
| 2004/0054715 A1 | 3/2004 | Cesario | |
| 2004/0100507 A1 | 5/2004 | Hayner et al. | |
| 2004/0221033 A1 | 11/2004 | Davis et al. | |
| 2009/0089404 A1 | 4/2009 | Guo | |
| 2010/0318507 A1 | 12/2010 | Grant et al. | |
| 2011/0246879 A1 | 10/2011 | White et al. | |
| 2012/0079374 A1 | 3/2012 | Gaddis | |
| 2012/0204102 A1 | 8/2012 | Gwin et al. | |
| 2013/0007622 A1 | 1/2013 | Ke et al. | |
| 2013/0219024 A1 | 8/2013 | Flack | |
| 2014/0141875 A1 | 5/2014 | Faria | |
| 2014/0173417 A1 | 6/2014 | He | |
| 2014/0289855 A1 | 9/2014 | Schulman et al. | |
| 2015/0205772 A1 | 7/2015 | Leventhal | |
| 2016/0173925 A1 | 6/2016 | Gordon et al. | |
| 2017/0171252 A1 | 6/2017 | Xue et al. | |
| 2017/0351484 A1 | 12/2017 | Stuckman et al. | |
| 2018/0123934 A1 | 5/2018 | Gissing et al. | |
| 2018/0205782 A1 | 7/2018 | Wei et al. | |
| 2019/0034213 A1 | 1/2019 | Zweig et al. | |
| 2019/0079787 A1 | 3/2019 | Toksoz et al. | |
| 2019/0392057 A1 | 12/2019 | Denoue et al. | |
| 2020/0233628 A1 * | 7/2020 | He | G06F 9/445 |
| 2021/0203635 A1 | 7/2021 | Shalikashvili et al. | |
| 2021/0256200 A1 | 8/2021 | Miller et al. | |
| 2022/0004594 A1 | 1/2022 | Smith et al. | |
| 2023/0114651 A1 | 4/2023 | Bar Hakim et al. | |
| 2023/0116021 A1 | 4/2023 | Bar Hakim et al. | |
| 2024/0127325 A1 * | 4/2024 | Adler | G06F 9/455 |

FOREIGN PATENT DOCUMENTS

| | | |
|---|---|---|
| CN | 110196744 A | 5/2019 |
| CN | 112882953 A | 6/2021 |

OTHER PUBLICATIONS

U.S. Appl. No. 17/959,319 Office Action dated Jan. 31, 2024.

U.S. Appl. No. 17/959,319 Office Action dated Apr. 23, 2024.

U.S. Appl. No. 17/746,981 Office Action dated Aug. 11, 2023.

U.S. Appl. No. 17/959,319 Office Action dated Sep. 19, 2023.

International Application # PCT/US2023/065981 Search Report Aug. 4, 2023.

International Application # PCT/US2023/066801 Search Report Sep. 19, 2023.

Betapage, "Sitemod.io—Modify any website in real-time, Save your mod and Share it with the world", pp. 1-3, year 2022 https://betapage.co/product/sitemod-io.

Prestipino, "Modify Any Website in Real-Time with Sitemod.io & Chrome Developer Tools", pp. 1-3, Sep. 21, 2017 https://www.websitemagazine.com/blog/modify-any-website-in-real-time-with-sitemod-io-chrome-developer-tools.

"Sitemod.io—Fork Demo", pp. 1-1, YouTube Clip, last edited May 7, 2021 https://chrome.google.com/webstore/detail/sitemodio/efjbaneaebkanjmhengnedpllfdiocin?itemlang=te&hl=en.

Meclea, "Sitemod.io—Fork Demo", YouTube Clip, p. 1, Oct. 10, 2017 https://www.youtube.com/watch?v=COzKh56T0OM.

"Edit Any Website—No Code Required", pp. 1-6, year 2019-2022 https://goedit.me/.

Highsoft AS, "Highcharts", Software Sources Ltd., pp. 1-9, Jul. 30, 2021 https://software-sources.com/solutions/highsoft/.

Wikipedia, "Remote Desktop Protocol," pp. 1-11, last edited Sep. 21, 2021 https://web.archive.org/web/20210924044957/https://en.wikipedia.org/wiki/Remote_Desktop_Protocol.

"Microsoft Edge", p. 1, May 2015 https://www.techtarget.com/whatis/definition/Microsoft-Edge.

"Android—Login Screen," pp. 1-10, year 2022 https://www.tutorialspoint.com/android/android_login_screen.htm.

Wikipedia, "Selenium (Software)," pp. 1-6, last edited Sep. 21, 2021.

"Android Developers—WindowManager.LayoutParams—Flag_Secure," pp. 1-91, last updated Jul. 14, 2021 https://web.archive.org/web/20211005002148/https://developer.android.com/reference/android/view/WindowManager.LayoutParams.

"React Tutorial From Scratch: A Step-by-Step Guide," Ibaslogic.com, pp. 1-27, year 2021 https://software-sources.com/solutions/highsoft/.

"AngularJS—Superheroic Java Script MNW Framework," Google, pp. 1-4, years 2010-2021 https://angularjs.org/.

"PagerDuty," PagerDuty, Inc., Google Play, pp. 1-3, Jun. 11, 2021 https://web.archive.org/web/20210624164153/https://play.google.com/store/apps/details?id=com.pagerduty.android.

"mitmproxy is a Free and Open Source Interactive HTTPS Proxy," Mitmproxy Project, pp. 1-4, Sep. 26, 2021 https://mitmproxy.org/.

"Apktool—A Tool for Reverse Engineering Android apk Files," pp. 1-3, Sep. 16, 2021 https://web.archive.org/web/20210916012637/https://ibotpeaches.github.io/Apktool/.

"APK Downloder," Evozi, pp. 1-2, year 2020 https://apps.evozi.com/apk-downloader/.

"Android Developers," pp. 1-6, last updated Jul. 22, 2020 https://web.archive.org/web/20210812034151/https://developer.android.com/guide/topics/manifest/provider-element.

Hardt, Ed., "The OAuth 2.0 Authorization Framework," Request for Comments 6749, pp. 1-76, Oct. 2012.

"square/okhttp," GitHub, Inc., pp. 1-5, Sep. 28, 2021 https://github.com/square/okhttp.

"square/retrofit," Square, Inc., pp. 1-2, year 2013 https://github.com/square/retrofit.

"Android Developers—Network Security Configuration," pp. 1-12, Sep. 26, 2021 https://developer.android.com/training/articles/security-config.

"mitmproxy docs—About Certificates," pp. 1-5, Sep. 22, 2021 https://web.archive.org/web/20210922085629/https://docs.mitmproxy.org/stable/concepts-certificates/.

"AppAuth-Android," GitHub, Inc., pp. 1-5, Sep. 12, 2021 https://web.archive.org/web/20210912131650/https://openid.github.io/AppAuth-Android/.

Tiberg et al, U.S. Appl. No. 17/746,981, filed May 18, 2022.

U.S. Appl. No. 17/949,263 Office Action dated May 17, 2023.

* cited by examiner

MOBILE APPLICATION CLONING

FIELD OF THE INVENTION

The present invention relates generally to demonstration software, specifically to cloning a target mobile application into separate recorder and viewer versions of the application that can be used to demonstrate the target application.

BACKGROUND OF THE INVENTION

A product demonstration (i.e., "demo") is typically used to present a software application such as a business-to-business software as a service application. The product demo can be used to show the value of a software application to a current or prospective customer, and typically involves a demonstration of the application's core features and capabilities.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for demonstrating a target application, including receiving code of the target application, performing first modifications to the code so as to generate a recorder version of the target application, performing second modifications to the code so as to generate a viewer version of the target application, detecting, using the recorder version of the target application, a set of first requests submitted by the recorder version of the target application and respective responses to the first requests, storing the set of first requests and the respective responses to a file, and upon detecting, using the viewer version of the target application, a second request submitted by the viewer version of the target application matching a given first request in the set, retrieving, from the file, a respective response to the given first request, and conveying, in response to the second request, the retrieved response to the viewer version of the target application.

In one embodiment, the code of the target application includes a security flag, and wherein the first and the second modifications include removing the security flag.

In another embodiment, the modifications to the code include adding certificate authorities for the recorder and the viewer versions.

In an additional embodiment, one of the first requests includes a nonce for a login request, and wherein the response to the one of the first requests includes a login confirmation.

In a further embodiment, the code of the target application includes a domain for a resource from a resource server, and wherein performing the modifications to the code includes modifying the domain so as to reference a demo server including the file.

In some embodiments, detecting a first given request includes receiving, by the demo server, a request for a resource hosted by the resource server, conveying the request to the resource server, and receiving, from the resource server, a response to the conveyed request, and wherein storing the given response includes storing, to the file on the demo server, the response to the conveyed request.

In other embodiments, detecting the second request includes receiving, by the demo server, the second request, and wherein retrieving the respective response includes retrieving the respective response from the file on the demo server.

In a supplemental embodiment, the first requests are from a computing device executing the recorder version and including a sensor, wherein one of the first requests is to the sensor, and wherein the response to the one of the first requests includes a response from the sensor.

In one embodiment, the target application includes a target application name, wherein performing the first modifications includes assigning a recorder application name to the recorder version, wherein performing the second modifications includes assigning a viewer application name to the viewer version, and wherein the target application name, the recorder application name and the viewer application name are all different.

In some embodiments, the target application includes one or more content providers including the target application name, wherein performing the first modifications includes updating, in the one or more content providers, the target application name with the recorder application name, and wherein performing the second modifications includes updating, in the one or more content providers, the target application name with the viewer application name.

In another embodiment, the target application includes a target package name, wherein performing the first modifications includes assigning a recorder package name to the recorder application, wherein performing the second modifications includes assigning a viewer package name to the viewer version, and wherein the target package name, the recorder package name and the viewer package name are all different.

There is also provided, in accordance with an embodiment of the present invention, an apparatus for demonstrating a target application, including a memory, and one or more processors configured to receive and store to the memory, code of the target application, to perform first modifications to the code so as to generate a recorder version of the target application, to perform second modifications to the code so as to generate a viewer version of the target application, to detect, using the recorder version of the target application, a set of first requests submitted by the recorder version of the target application and respective responses to the first requests, to store the set of first requests and the respective responses to a file, and upon detecting, using the viewer version of the target application, a second request submitted by the viewer version of the target application matching a given first request in the set, to retrieve, from the file, a respective response to the given first request, and to convey, in response to the second request, the retrieved response to the viewer version of the target application.

There is additionally provided, in accordance with an embodiment of the present invention, a computer software product for demonstrating a target application, including a non-transitory computer-readable medium, in which program instructions are stored, which instructions, when read by a computer, cause the computer to receive code of the target application, to perform first modifications to the code so as to generate a recorder version of the target application, to perform second modifications to the code so as to generate a viewer version of the target application, to detect, using the recorder version of the target application, a set of first requests submitted by the recorder version of the target application and respective responses to the first requests, to store the set of first requests and the respective responses to a file, and upon detecting, using the viewer version of the target application, a second request submitted by the viewer version of the target application matching a given first request in the set, to retrieve, from the file, a respective response to the given first request, and to convey, in response to the second request, the retrieved response to the viewer version of the target application.

BRIEF DESCRIPTION OF THE DRAWINGS

The disclosure is herein described, by way of example only, with reference to the accompanying drawings, wherein.

DETAILED DESCRIPTION OF EMBODIMENTS

Restrictions that are imposed by mobile operating systems make it difficult to generate demonstration versions of software applications executing on mobile devices. In one example, mobile operating systems typically allow only a single instance of a given application to be executing at any given time. In another example, mobile operating systems typically require that each software application installed on a given mobile device has a unique application name.

Embodiments of the present invention provide methods and systems for cloning a mobile application into separate and distinct recorder and viewer (i.e., demo playback) versions of the application that can be used to demonstrate the mobile application. In embodiments herein the mobile application to be cloned may be referred to as a target application.

As described hereinbelow, upon receiving code of the target application, first modifications are made to the code so as to generate a recorder version of the target application, and second modifications are made to the code so as to generate a viewer version of the target application. To generate a demonstration of the target application, a user initiates execution of the recorder versions of the target application, also referred to herein simply as the recorder application. While using (i.e., executing) the recorder application, a set of first requests submitted by the recorder version of the target application and respective responses to the first requests are detected, and the set of first requests and the respective responses are stored to a file.

Once the first requests and the responses are stored to the file, the viewer version of the target application (also referred to herein simply as the viewer application) can access the file so as to demonstrate the target application. While using the viewer application, upon detecting a second request submitted by the viewer application matching a given first request in the set, a respective response to the given first request can be retrieved from the file. In response to the second request, the retrieved response can be conveyed to the viewer application.

System Description

Figure 1:
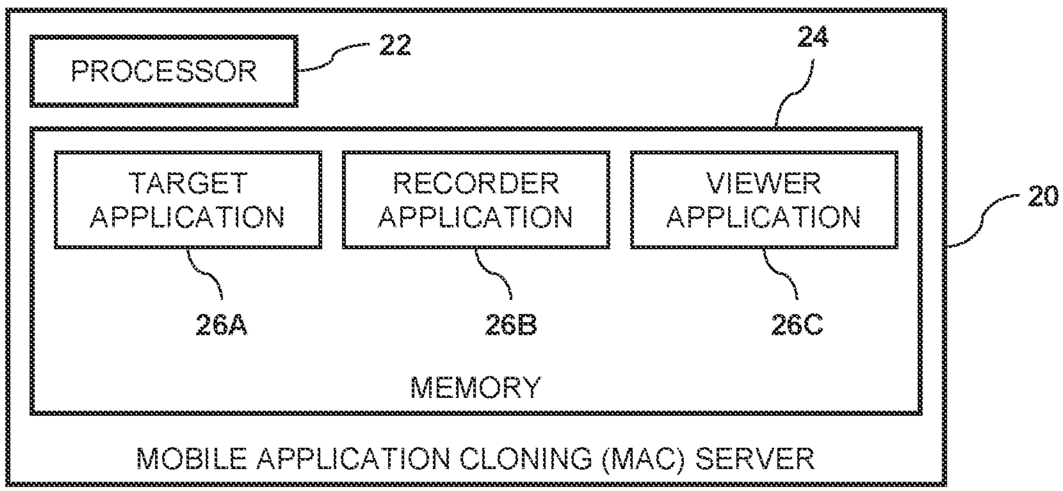
FIG. 1 is a block diagram that schematically shows hardware and software components of a target mobile application modification server, in accordance with an embodiment of the present invention.

FIG. 1 is a block diagram that schematically shows an example of a mobile application cloning (MAC) server 20, in accordance with an embodiment of the present invention. In some embodiments, mobile application cloning server 20 comprises a cloning processor 22 and a cloning memory 24 that stores a set of software applications 26.

In embodiments described herein, software applications 26 can be differentiated by appending a letter to the identifying numeral, so that the software applications comprise target application 26A, recorder application 26B and viewer application 26C. Using embodiments described herein, processor 22 can create a demonstration version of target application 26A by modifying the target application so as to generate recorder application 26B (i.e., a recorder version of the target application) and viewer application 26C (i.e., a viewer version of the target application.

Figure 2:
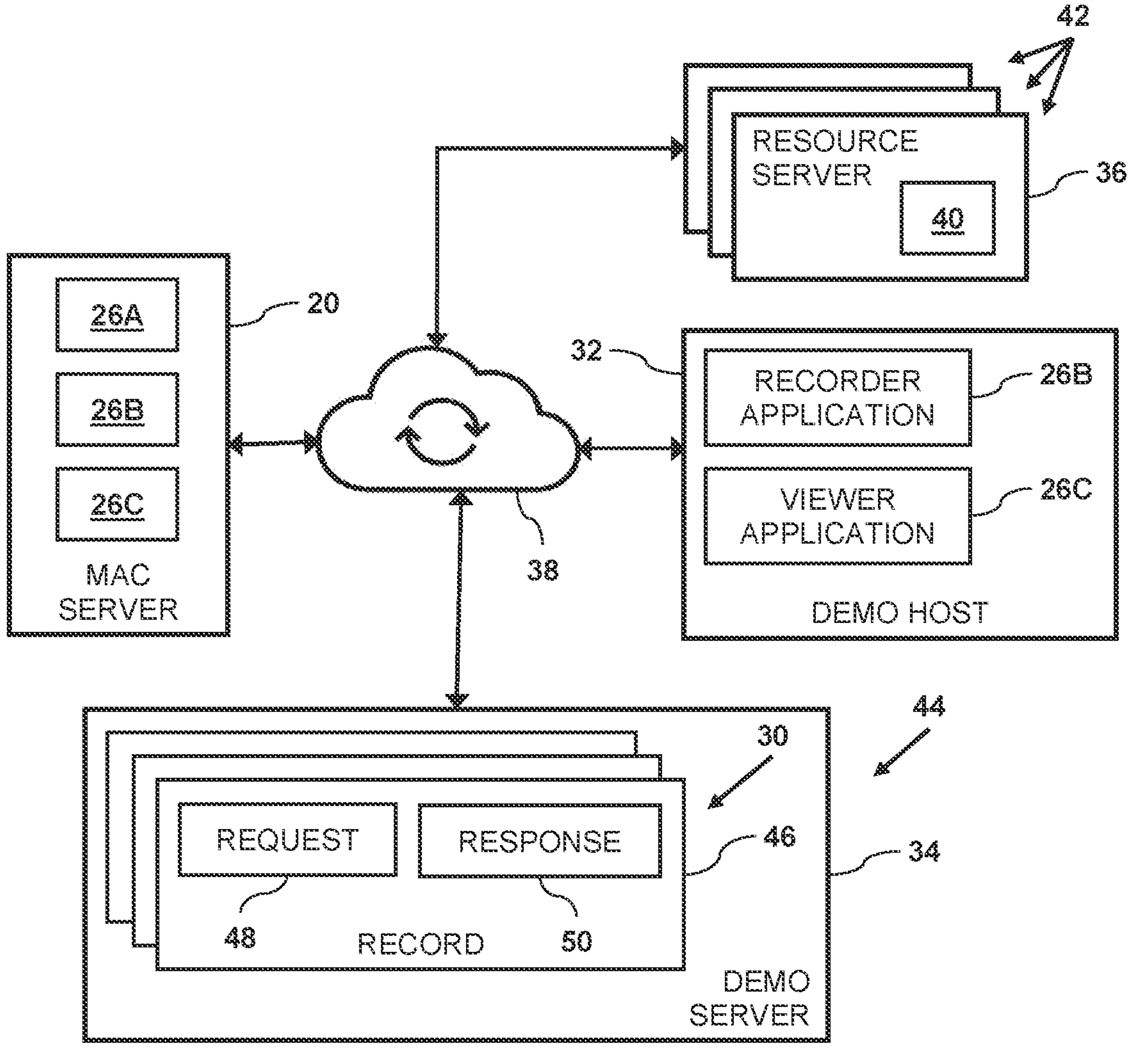
FIG. 2 is a block diagram that shows an example of a demo server and a demo host that can communicate over the Internet with a set of resource servers so as to generate a demo recording for the target application, in accordance with an embodiment of the present invention.

FIG. 2 is a block diagram showing an example of computing resources that recorder application 26B can use to generate a recording 30 that viewer application 26C can use to demonstrate target application 26, in accordance with an embodiment of the present invention.

In the configuration shown in FIG. 2, mobile application cloning server 20, a demo host 32, a demo server 34 that stores recording 30, and a set of resource servers 36 are all coupled to (and communicate over) a public network such as Internet 38. Upon generating applications 26B and 26C, mobile application cloning server 20 can convey the recorder and the viewer applications to demo host 32. As described hereinbelow, demo host 32 executes recorder application 26B so as to create recording 30, which viewer application 26C (also executing on demo host 32) can access so as to demonstrate target application 26A.

Resource servers 36 store and provide, to target application 26A, resources 40 such as code, data and/or web-based resources (e.g., weather information). Resource servers 36 can be referenced by respective resource Uniform Resource Locators (URLs) 42.

Demo server 34 can be referenced by a demo URL 44, and stores recording 30 that comprises a set of records 46. In embodiments described herein, each record 46 comprises a stored request 48 and a stored response 50.

Figure 3:
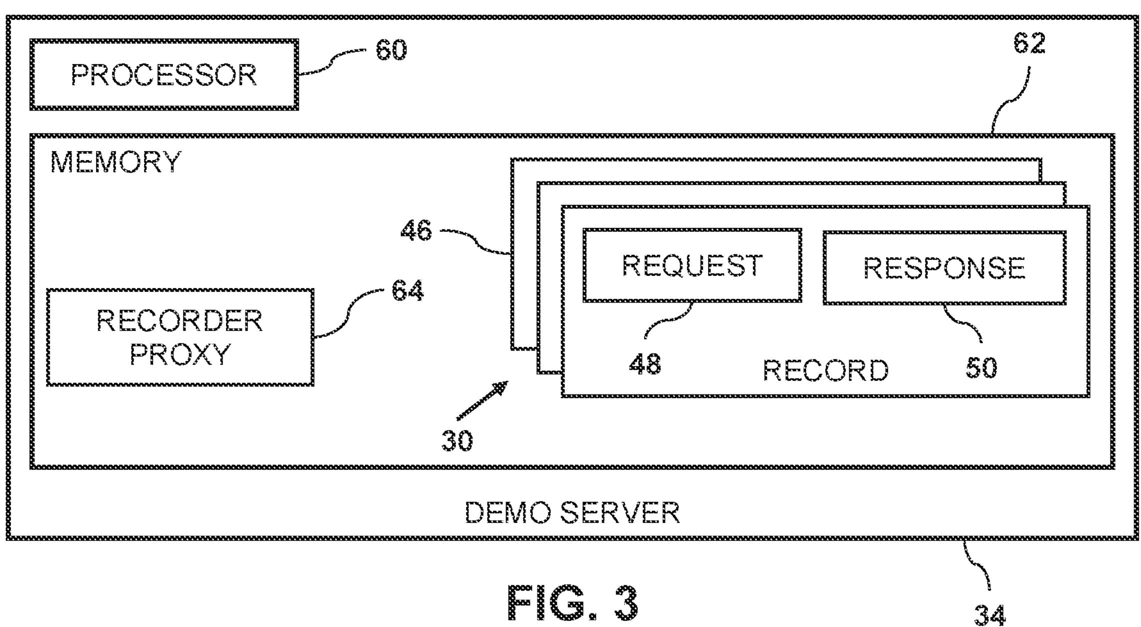
FIG. 3 is a block diagram that shows hardware and software components of demo server, in accordance with an embodiment of the present invention.

FIG. 3 is a block diagram showing an example of hardware, software and data components of demo server 34 in accordance with an embodiment of the present invention. Demo server 34 may comprise a server processor 60 and a server memory 62 that stores recording 30 and a recorder proxy 64. As described hereinbelow, recorder application 26B interacts with recorder proxy 64 so as to create recording 30.

Figure 4:
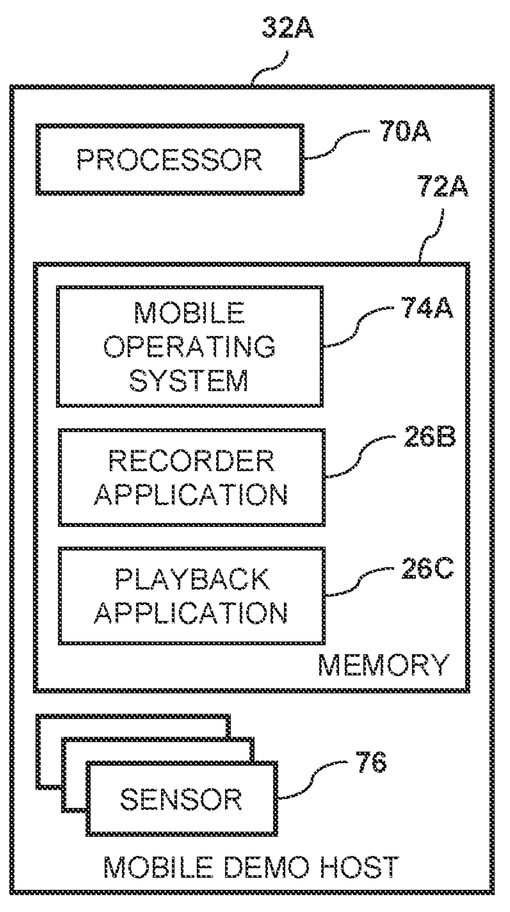
FIG. 4 is a block diagram that shows hardware and software components of the demo host, in accordance with a mobile embodiment of the present invention.

FIGS. 4 are 5 are block diagrams showing examples of demo host 32 in accordance with different embodiments of the present invention. Demo host 32 comprises a host processor 70 and a host memory 72 that stores recorder application 26B, viewer application 26C and an operating system 74 that the host processor executes from the host memory.

Figure 5:
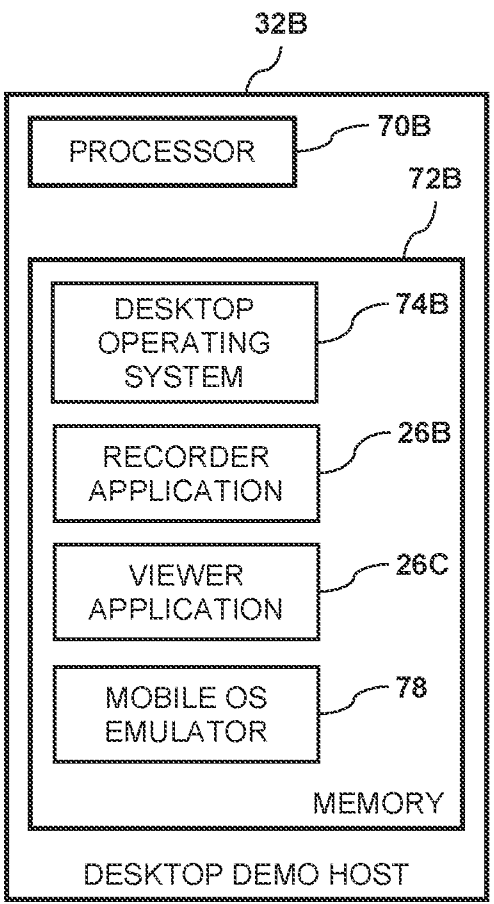
FIG. 5 is a block diagram that shows hardware and software components of the demo host, in accordance with a desktop embodiment of the present invention.

In FIGS. 4 and 5, demo hosts 32, host processors 70, host memories 72 and operating systems 74 can be respectively differentiated by appending a letter to the identifying numeral, so that the demo hosts comprise mobile demo host 32A and desktop demo host 32B, the host processors comprise mobile processor 70A and desktop processor 70B, the host memories comprise mobile memory 72A and desktop memory 72B, and the operating systems comprise mobile operating system 74A and desktop operating system 74B.

In FIG. 4, demo host 32A comprises a mobile device such as a cellular phone whose respective operating system 74A may be ANDROID™ (produced by Alphabet Inc., Mountain View, CA, USA). Mobile demo host may comprise one or more sensors (i.e., an input device) 76 such as a camera and a geolocation sensor. In embodiments described herein, applications 26 may comprise ANDROID PACKAGE KITS™ (also known as APKs™ as defined by Alphabet Inc.) that can natively execute on processor 70A.

In FIG. 5, demo host 32B comprises a desktop or laptop computing device such as a cellular phone whose respective operating system (OS) 74B may be WINDOWS™ (produced by Microsoft Corporation, Redmond WA, USA). In a first embodiment, memory 72B may comprise a mobile operating system emulator 78 that processor 70B can execute so as to enable execution of applications 26 on demo host 32B. In the first embodiment, an example of mobile OS emulator 78 is BLUESTACKS™, produced by Bluestacks, Campbell, California, USA.

In a second embodiment, memory 72B may comprise a web browser application 79 such as CHROME™ (produced by Alphabet Inc., Mountain View, CA, USA) that processor 70B can execute from memory 72B. In this embodiment, mobile operating system emulator 78 may comprise a web-based application implementing the ANDROID EMULATOR, which is managed in the Android Open Source Project repository (which can be found at source.android.com).

Figure 6:
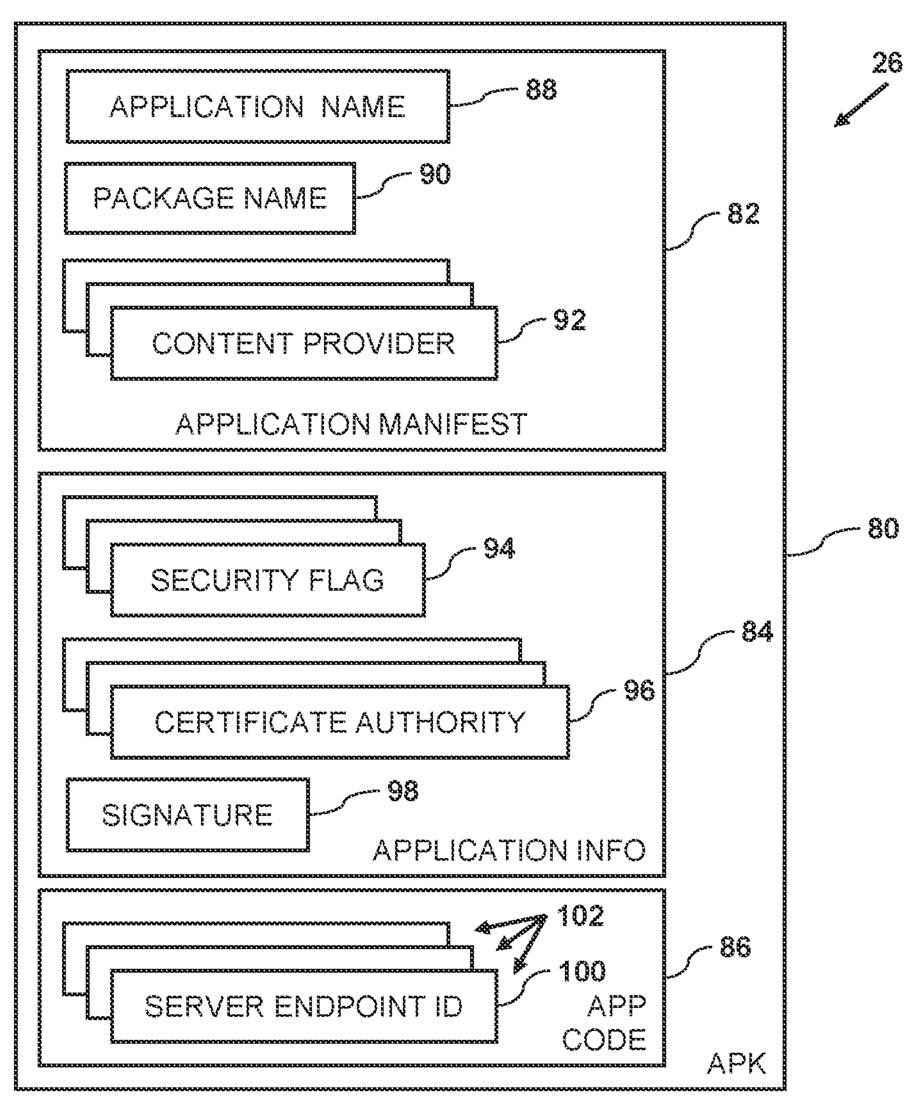
FIGS. 6 and 7 are block diagrams that shows software components of target, recorder and viewer applications, in accordance with an embodiment of the present invention.
Figure 7:
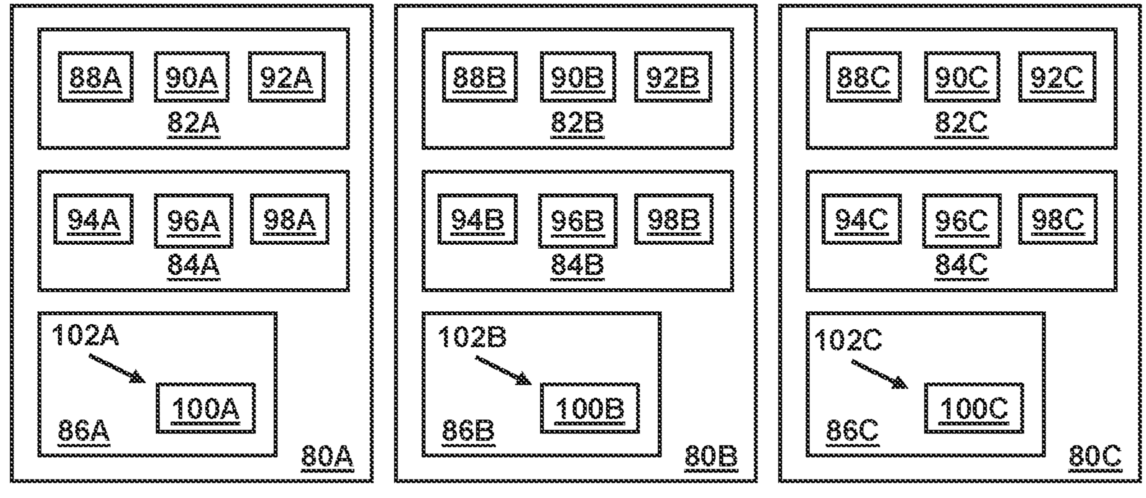

FIGS. 6 and 7 are block diagrams showing examples of software and configuration components of APKs™ 80 for applications 26, in accordance with an embodiment of the present invention. Each APK™ 80 is typically a compressed file that as shown in FIG. 6 comprises an application manifest 82, application information 84, and application code 86. Application manifest 82 and application information 84 may collectively be referred to as application resources.

Application manifest 82 may comprise a set of files that describe essential information about the given application such as:

- An application name 88 that uniquely identifies the given application in an application marketplace such as the GOOGLE PLAY STORE™ (provided by Alphabet Inc.).
- A package name 90 that uniquely identifies the given application on demo host 32. While application name 88 and package name 90 are typically identical, they can differ.
- One or more content providers 92 (allow known as data providers 92) that comprise uniform resource identifier (URI) authorities that enable the given application to share data with other applications executing on the demo host.

In some embodiments, application information 84 may comprise information such as:

- Security flags 94. Operating systems 72 such as ANDROID™ can use a set of security flags 94 in order to control security settings for the given application. For example, the security flag FLAGS_SECURE to enable or disable the given application to appear in screenshots or to be viewed in other screens. Additional examples of security flags 94 for ANDROID™ can be found at developer.android.com.
- Certificate authorities 96 (also known as trust certificates) that reference "trusted" sources (e.g., organizations and stores) that issue digital certificates for websites and other entities. Examples of these certificates include Secure Sockets Layer (SSL) and Transport Layer Security (TLS) certificates that cryptographically link the applications with public keys.
- An application signature 98 that ensures the trustworthiness of the given application and any updates to the given application. ANDROID™ requires that all APKs 80 be digitally signed with a given signature 98 (i.e., a signing certificate) before they are installed or updated on a device.

Application code 86 may comprise ANDROID™ runtime (ART) code that may include Extensible Markup Language (XML) code, HyperText Markup Language (HTML) code, Cascading Style Sheet (CSS) code, JavaScript (JS) code, Java and Dalvik bytecode. In some embodiments application code 86 may comprise one or more server endpoint identifications (IDs) 100 that have respective domain 102, and respectively reference one or more resource servers 36.

In some embodiments, a given server endpoint ID 100 may comprise a URL. Therefore, server endpoint IDs 100 may also be referred to herein as server endpoint URLs 100.

In FIG. 7, APKs 80 and their respective components can be differentiated by appending a letter to the identifying numeral, so that the APKs comprise APKs 80A-80C, the application manifests comprise manifests 82A-82C, the application information comprises application information 84A-84C, the application code comprises application code 86A-86C, the application names comprise application names 88A-88C, the package names comprise package names 90A-90C, the content providers comprise content providers 92A-92C, the security flags comprise security flags 94A-94C, the certificate authorities comprise certificate authorities 96A-96C, the signatures comprise signatures 98A-98C, the server endpoint IDs comprise server endpoint IDs 100A-100C, and the domains comprise domains 102A-102C. In embodiments described herein, APK 80A is associated with (i.e., stores the application code and the application resources for) target application 26A, APK 80B is associated with recorder application 26B, and APK 80C is associated with viewer application 26C.

Processors 22, 60 and 70 comprise general-purpose central processing units (CPU) or special-purpose embedded processors, which are programmed in software or firmware to carry out the functions described herein. This software may be downloaded to mobile application cloning server 20, demo server 34 or demo host 32 in electronic form, over a network, for example. Additionally or alternatively, the software may be stored on tangible, non-transitory computer-readable media, such as optical, magnetic, or electronic memory media. Further additionally or alternatively, at least some of the functions of processors 22, 60 and 70 may be carried out by hard-wired or programmable digital logic circuits.

Examples of memories 24, 62 and 72 include dynamic random-access memories, non-volatile random-access memories, hard disk drives and solid-state disk drives.

In some embodiments, tasks described herein performed by mobile application cloning server 22, demo server 34, and demo host 32 may be split among multiple physical and/or virtual computing devices such as physical and/or virtual servers. In other embodiments, these tasks may be performed by a managed cloud service.

Demo Application Creation and Deployment

Figure 8:
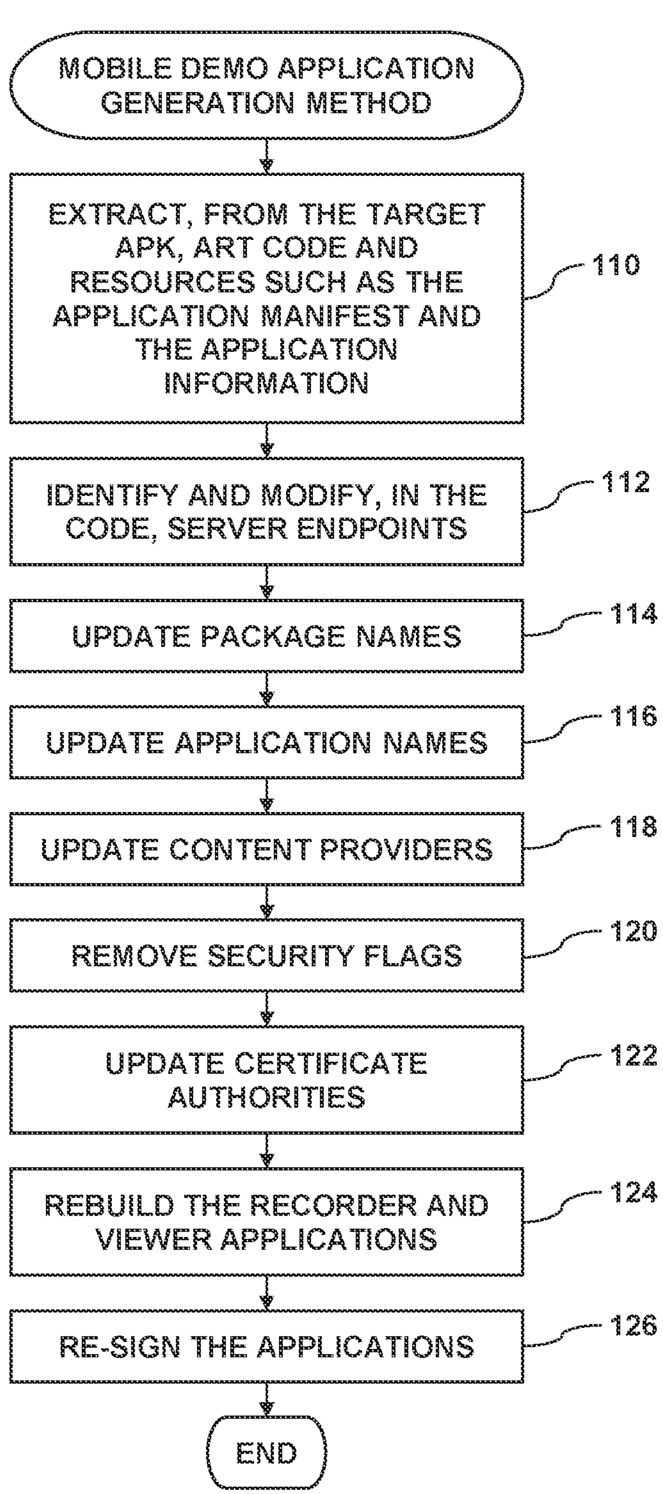
FIG. 8 is a flow diagram that schematically illustrates a method of cloning the target application into recorder and viewer applications, in accordance with an embodiment of the present invention.
Figures 9, 10, 11:
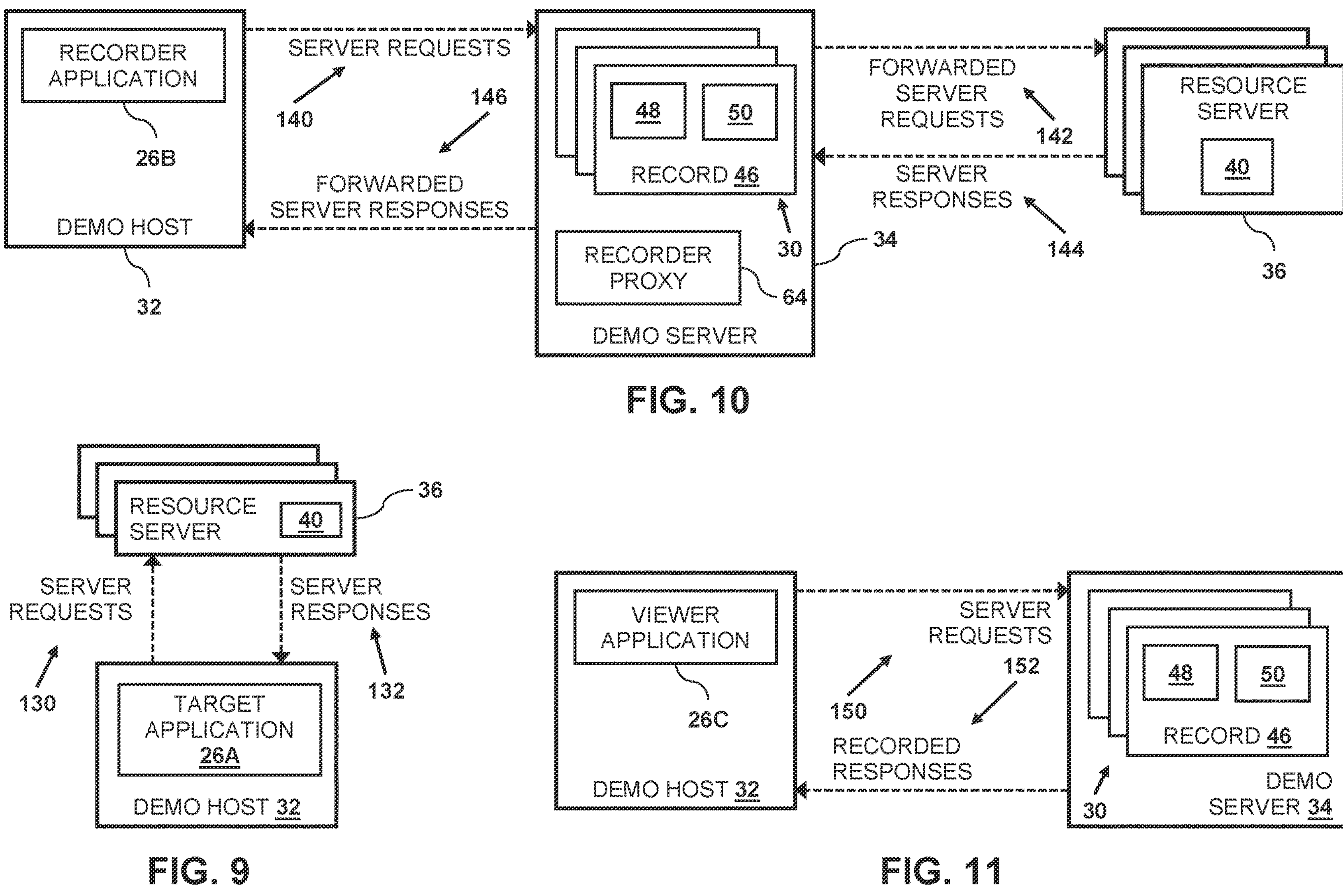
FIG. 9 is a block diagram that schematically illustrates the demo host communicating with the resource servers when executing the target application, in accordance with an embodiment of the present invention.
FIG. 10 is a block diagram that schematically illustrates the demo server communicating with the demo host and the resource servers when executing the recorder application, in accordance with an embodiment of the present invention.
FIG. 11 is a block diagram that schematically illustrates the demo server communicating with the demo host when executing the viewer application, in accordance with an embodiment of the present invention.

FIG. 8 is a flow diagram that schematically illustrates a method for cloning (i.e., modifying) target application 26A so as to generate recorder application 26B and viewer application 26C, FIG. 9 is a block diagram showing demo host 32 communicating with demo server 34 while target application 26C accesses resource server (s) 36, FIG. 10 is a block diagram showing demo server 34 communicating with the demo host and the resource server (s) while recorder application 26B creates recording 30, and FIG. 11 is a block diagram showing the demo host communicating with the demo server while viewer application 26C accesses the recording so as to demonstrates target application 26A, in accordance with an embodiment of the present invention.

For purposes of example, embodiments herein describe converting a given target application 26A called "AppXYZ" into corresponding applications 26B and 26C.

In step 110, processor 22 executes a software tool such as APKTOOL (which can be found at ibotpeaches.github.io) in order to extract, from APK 80A, application code 86A and the application resources such as application manifest 82A and application information 84A. For example, application code 86A may comprise Dalvik or Java code, and APKTOOL can (i.e., using its smali/backsmali tool) reverse the android Dalvik bytecode to Smali code, that can then be modified using embodiments described herein.

In step 112 processor 22 identifies any server endpoint IDs 100A in code 86A, and modifies the identified server endpoints, and stores the modified endpoints to server endpoint IDs 100B and 100C.

As shown in FIG. 9, when executing on demo host 32, target application 26A conveys server requests 130 to resource server(s) 36, and receives server responses 132 from the resource server(s) in response to requests 130. To create recording 30, processor 22 copies application code 86A to application code 86B and modifies server endpoint IDs 100B so that requests 130 are proxied to resource server(s) 36 through demo server 34.

As shown in FIG. 10, when executing recording application 26B so as to generate recording 30, the recording application conveys, to demo server 34, a server request 140 for a given resource 40. Upon receiving server request 140, recorder proxy 64 creates a new record 46, stores the received request to request 48 in the new record, and conveys, in a forwarded server request 142, the received request to a given resource server 36.

In response to forwarded request 142, the given resource server conveys a server response 144 to demo server 34. Upon receiving response 144, recorder proxy 64 stores the received response to response 50 in the new record, and coveys, in a forwarded server response 146, the received response to demo host 32.

To demonstrate target application 26A, processor 22 copies application code 86A to application code 86C and modifies server endpoint IDs 100C so that requests 130 are now conveyed to demo server 34.

As shown in FIG. 11, when executing viewer application 26C so as to demonstrate target application 26A, the viewer application conveys, to demo server 34, a server request 150. Upon receiving request 150, demo server 34 identifies a given record 46 whose request 48 matches the received request, and in response to request 150, the demo server conveys, to demo host 3 in a recorded response 152, response 50 in the given record.

Therefore, for each server endpoint ID 100A, processor 22 generates a corresponding server endpoint ID 100B that recorder proxy 64 uses to create recording 30, and a corresponding server endpoint ID 100C that accesses the recording on the demo server. In other words, processor 22 needs to update server endpoint IDs 100B and 100C so that they reference demo server 34.

In the example where the target application comprises AppXYZ, processor 22 can create the recorder and the viewer applications by modifying server endpoint URLs 100 in code 86. These server endpoint URLs 100 may be embedded in smali code, located at com/appxyz/api/common/c.smali: const-string v0, "appxyz.com"

For example, if domain 102A is appxyz.com, processor 22 can define domain 102B as viewer.appxyz.demostack-recording-engine.com and define domain 102C as recorder.appxyz.demostack-recording-engine.com In this example, domain 102A references a given resource server 36, and processor 22 can define domain 102B by copying domain 102A to domain 102B, and updating domain 102B so that domain 102B references demo server 34. Similarly, processor 22 can define domain 102C by copying domain 102A to domain 102C, and updating domain 102C so that domain 102C references demo server 34.

Typically, APK 80 stores server endpoint URLs 100 in cleartext). In one embodiment (i.e., as described in the example described supra) processor 60 can identify (and then modify) server endpoint URLs 100A in application code 86. In an additional embodiment, APK 80 may store server endpoint URLs 100A in a configuration file (not shown) that may comprise Extensible Markup Language (XML). In this embodiment, processor 60 can use embodiments described hereinabove to identify and then modify any server endpoint URLs 100A in the configuration file.

One example of an interaction between demo host 32 and a given resource server while executing application 26A is a login request 130 based on the OAuth 2.0 protocol. As part of the protocol, the login request includes a state query parameter that is used as a nonce. For example, while executing application 26A AppXYZ, the login request may comprise:

GET https://app.appxyz.com/global/oauth/authorize?redirect_uri=com.

appxyz.android%3A%2%2Fmobile%2Foauth&client_id=786d93e55f7f71f32c43f28d6dd1b8f4607522a7800de85a8e0553153b68bb6f&response_type=code&prompt=login&state=bnbZ0DOpSKkZ_wRscjlSgQ&scope=openid:20write&code_challenge=AxFxWlQlpynNdQaWq1psHNsReqwtsKojlx_DU1WVexo&code_challenge_method=S256

When executing applications 26B or 26C, in order to have a successful login flow, the state parameter provided by demo host 32 typically must match the response location header that is returned from the authorize POST request:

POST https://app.appxyz.com/global/oauth/authorize?client_id=786d93e55f7f7 1f32c43f28d6dd1b8f4607522a7800de85a8e0553153b68bb6f& forceAuthN=true

Response:

Headers:

location:

com.

appxyz.android://mobile/oauth?code=otPkZCcnUGJ2aBxC9p5yFGb5u6k3tUia&state=bnbZ0DOpSKkZ_wRscjlSgQ&session_state=4nF RYXAcxLXcxh9xU0Hb4DrNP5la7BzFmc1Y0U1AGp8%3D.eQjWIaD43xKz Therefore, in case of an OAuth request, demo server 34 can store the OAuth state to recording 30 by storing the OAuth state to a given response 50 in given record 46 file. In response to a given POST authorize request 152 from demo host 32 executing viewer application 26C, demo server 34 can then retrieve and convey the given response to demo host 32 in a given response 152.

Another possible embodiment may comprise saving, to memory 72 on demo host 32, the nonce in a cookie (not shown) in order to avoid saving the state persistently. This also allows supporting multiple OAuth login flows in parallel which in the previous embodiment can cause a race condition.

Returning to the flow diagram in FIG. 8, in step 114, processor 22 retrieves package name 90A, updates the retrieved package name into new package names 90 for the recorder and the viewer applications, and stores the updated package names to package names 90B and 90C. In some embodiments, processor 22 can update package name 90A by updating, the generated apktool.yml in APKs 80B and 80C, and setting renameManifest Package to package name 90B in APK 80B and package name 90C in APK 80C. For example, if package name 90A is com.appxyz.android, processor 22 can set package name 90B to com.appxyz.android.recorder, and set package name 90C to com.appxyz-.android.viewer. Package names 90A, 90B and 90C are typically different from one another.

In step 116 processor 22 retrieves application name 88A, updates the retrieved application name into new application names 88 for the recorder and the viewer applications, and stores the updated application names to application names 88B and 88C. In some embodiments, processor 22 can update package name 90A For example, if application name 88A is AppXYZ, processor 22 can set update strings.xml in APKs 80B and 80C by setting app_name (i.e., application name 88) to <string name="app_name">Appxyz Recorder</string>

(or simply recorder) in APK 80B, and

<string name="app_name">Appxyz Viewer</string>

(or simply viewer) in APK 80C. Application names 88A, 88B and 8C are typically different from one another.

In step 118 processor 22 retrieves content providers 92A, (i.e., content providers data authorities as stored in android: authorities), updates the retrieved content providers into new content providers 92 for the recorder and the viewer applications, and stores the updated content providers to content providers 92B and 92C. To update content providers 92, processor 22 can update AndroidManifest.xml by modifying the android: authorities attribute values.

For example, if content providers 92A are:

com.appxyz.android.com.squareup.picasso com.appxyz.android.firebaseinitprovider com.appxyz.android.lifecycle-processprocess processor 22 can update content providers 92B in APK 80B as follows:

Update com.appxyz.android.com.squareup.picasso to com.appxyz.android.recorder.com.squareup.picasso Update com.appxyz.android.firebaseinitprovider to com.appxyz.android.recorder.firebaseinitprovider Update com.appxyz.android.lifecycle-process to com.appxyz.android.recorde.lifecycle-process and update content providers 92C in APK 80C as follows:

Update com.appxyz.android.com.squareup.picasso to com.appxyz.android.viewer.com.squareup.picasso Update com.appxyz.android.firebaseinitprovider to com.appxyz.android.viewer.firebaseinitprovider Update com.appxyz.android.lifecycle-process to com.appxyz.android.viewer.lifecycle-process In this example, content providers 92A comprise application name 88A (i.e., AppXYZ), and processor 22 updates content provider 92B by copying content providers 92A to 92B, and updating content providers 92B so that content providers 92B comprise application name 88B (i.e., recorder). Similarly, processor 22 can update content provider 92C by copying content providers 92A to 92C, and updating content providers 92C so that content providers 92C comprise application name 88C (i.e., viewer).

In step 120, processor 22 retrieves security flags 94A, updates the retrieved security flags by commenting them out (i.e., so as to remove them), and stores the updated security flags to security flags 94B and 94C. For example, to enable applications 26B and 26C to (a) appear in screenshots, (b) to be executed by emulator 78, or (c) to be viewed on connected screen displays (like connecting a physical Android device to a PC, for example), the FLAG SECURE flag 94 should be removed. Therefore, in the Appxyz example, processor 22 can commented out the setFlags call, located at com/appxyz/android/AppxyzActivity.smali:invoke-virtual {v0, v1, v1}, Landroid/view/Window;→setFlags (II) V In step 122, processor 22 retrieves certificate authorities 96A, updates the retrieved certificate authorities, and stores the updated certificate authorities to certificate authorities 96B and 96C. For example, in order to have trusted secure sockets layer (SSL) communication, processor 22 needs to install a new certificate authority on demo host 32. This enables (i.e., while executing applications 26B and 26C), demo host 32 to sign and view any SSL-encrypted traffic leaving the demo host. However, ANDROID™ (i.e., versions subsequent to version 7.0/platform version 24) may enforce an additional security setting, allowing only system certificate authorities in applications by default. This means (i.e, in addition to trusting the certificate authorities from servers 36), processor 22 can modify the application network security configuration and override it in order to allow user installed certificates (i.e., for both recorder application 26A and viewer application 26C). For example, processor 22 can add the entry <certificates src="user"/> to res/xml/network security config.xml as follows:

```
<base-config>
<trust-anchors>
<certificates src="system"/>
<certificates src="user"/>
</trust-anchors>
</base-config>
```

In step 124, processor 22 can use a tool such as APKTOOL in order rebuild (also known as repackaging) applications 26B and 26B.

Finally In step 126, processor 22 can re-sign applications 26B and 26C, and the method ends. To re-sign applications 26B and 26C, processor 22 can use the JARSIGNER tool using the following command lines so as to respectively rebuild applications 26A and 26B:

jarsigner—sigalg SHA256withRSA—digestalg SHA256—keystore key.keystore Appxyz-Recorder-.apk alias_name jarsigner—sigalg SHA256withRSA—digestalg SHA256—keystore key.keystore Appxyz-Viewer.apk alias_name As described supra, embodiments of the present invention perform first modifications to target application 26A so as to create recorder application 26B and perform second modifications to the target application so as to create viewer application 26C. These modifications comprise, as described hereinabove, modifications, to application name 88, package name 90, content providers 92, security flags 94, certificate authorities 96, signature 98, and application code 86 (e.g., server endpoint IDs 100).

In some embodiments, as described supra, mobile demo host 32A may comprise one or more sensors 76. In one recording embodiment, while creating recording 30, a given request 140 may comprise a request to a given sensor 76 (e.g., for geo-location data). In this recording embodiment, upon receiving, from the given sensor, a response to the request processor 70A can forward the sensor request and sensor response to demo server 34, which can then store the sensor request and the sensor response to recording 30 using embodiments described hereinabove.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for demonstrating a target application, comprising:

receiving code of the target application;

performing first modifications to the code so as to generate a recorder version of the target application;

performing second modifications to the code so as to generate a viewer version of the target application;

intercepting, by the recorder version of the target application, requests and responses made by the target application to detect, executing the recorder version of the target application, a set of first requests submitted by the recorder version of the target application and respective responses to the first requests;

storing the set of first requests and the respective responses to a file; and upon detecting, executing the viewer version of the target application, a second request submitted by the viewer version of the target application matching a given first request in the set, retrieving, from the file, a respective response to the given first request, and conveying, in response to the second request, the retrieved response to the viewer version of the target application.

2. The method according to claim 1, wherein the code of the target application comprises a security flag, and wherein the first and the second modifications comprise removing the security flag.

3. The method according to claim 1, wherein the first and second modifications to the code comprise adding certificate authorities for the recorder and the viewer versions.

4. The method according to claim 1, wherein one of the first requests comprises a nonce for a login request, and wherein the respective response to the one of the first requests comprises a login confirmation.

5. The method according to claim 1, wherein the code of the target application comprises a domain for a resource from a resource server, and wherein performing the first and second modifications to the code comprises modifying the domain so as to reference a demo server comprising the file.

6. The method according to claim 5, wherein detecting a first given request comprises receiving, by the demo server, a request for a resource hosted by the resource server, conveying the request for the resource to the resource server, and receiving, from the resource server, a response to the conveyed request, and wherein storing the response to the conveyed request comprises storing, to the file on the demo server, the response to the conveyed request.

7. The method according to claim 5, wherein detecting the second request comprises receiving, by the demo server, the second request, and wherein retrieving the respective response comprises retrieving the respective response from the file on the demo server.

8. The method according to claim 1, wherein the first requests are from a computing device executing the recorder version and comprising a sensor, wherein one of the first requests is to the sensor, and wherein the respective response to the one of the first requests comprises a response from the sensor.

9. The method according to claim 1 wherein the target application comprises a target application name, wherein performing the first modifications comprises assigning a recorder application name to the recorder version, wherein performing the second modifications comprises assigning a viewer application name to the viewer version, and wherein the target application name, the recorder application name and the viewer application name are all different.

10. The method according to claim 9, wherein the target application comprises one or more content providers comprising the target application name, wherein performing the first modifications comprises updating, in the one or more content providers, the target application name with the recorder application name, and wherein performing the second modifications comprises updating, in the one or more content providers, the target application name with the viewer application name.

11. The method according to claim 1, wherein the target application comprises a target package name, wherein performing the first modifications comprises assigning a recorder package name to the recorder application, wherein performing the second modifications comprises assigning a viewer package name to the viewer version, and wherein the target package name, the recorder package name and the viewer package name are all different.

12. An apparatus for demonstrating a target application, comprising:

a memory; and one or more processors configured:

to receive and store to the memory, code of the target application, to perform first modifications to the code so as to generate a recorder version of the target application, to perform second modifications to the code so as to generate a viewer version of the target application, to intercept, by the recorder version of the target application, requests and responses made by the target application to detect, executing the recorder version of the target application, a set of first requests submitted by the recorder version of the target application and respective responses to the first requests, to store the set of first requests and the respective responses to a file, and upon detecting, executing the viewer version of the target application, a second request submitted by the viewer version of the target application matching a given first request in the set, to retrieve, from the file, a respective response to the given first request, and to convey, in response to the second request, the retrieved response to the viewer version of the target application.

13. The apparatus according to claim 12, wherein the code of the target application comprises a security flag, and wherein the first and the second modifications comprise removing the security flag.

14. The apparatus according to claim 12, wherein a given processor is configured to perform the first and second modifications to the code by adding certificate authorities for the recorder and the viewer versions.

15. The apparatus according to claim 12, wherein one of the first requests comprises a nonce for a login request, and wherein the respective response to the one of the first requests comprises a login confirmation.

16. The apparatus according to claim 12, wherein the code of the target application comprises a domain for a resource from a resource server, and wherein a given processor is configured to perform the first and second modifications to the code by modifying the domain so as to reference a demo server comprising the file.

17. The apparatus according to claim 16, wherein the demo server is configured to detect a first given request by receiving a request for a resource hosted by the resource server, conveying the request for the resource to the resource server, and receiving, from the resource server, a response to the conveyed request, and wherein the demo server is configured store, to the file, the response to the conveyed request.

18. The apparatus according to claim 16, wherein the demo server is configured to detect the second request by receiving the second request, and wherein the demo server is configured to retrieve the respective response by retrieving the respective response from the file.

19. The apparatus according to claim 12, wherein the first requests are from a computing device executing the recorder version and comprising a sensor, wherein one of the first requests is to the sensor, and wherein the respective response to the one of the first requests comprises a response from the sensor.

20. The apparatus according to claim 12, wherein the target application comprises a target application name, wherein a given processor is configured to perform the first modifications by assigning a recorder application name to the recorder version, wherein the given processor is configured to perform the second modifications by assigning a viewer application name to the viewer version, and wherein the target application name, the recorder application name and the viewer application name are all different.

21. The apparatus according to claim 20, wherein the target application comprises one or more content providers comprising the target application name, wherein a given processor is configured to perform the first modifications by updating, in the one or more content providers, the target application name with the recorder application name, and wherein the given processor is configured to perform the second modifications by updating, in the one or more content providers, the target application name with the viewer application name.

22. The apparatus according to claim 12, wherein the target application comprises a target package name, wherein a given processor is configured to perform the first modifications by assigning a recorder package name to the recorder application, wherein the given processor is configured to perform the second modifications by assigning a viewer package name to the viewer version, and wherein the target package name, the recorder package name and the viewer package name are all different.

23. A computer software product for demonstrating a target application, the computer software product comprising a non-transitory computer-readable medium, in which program instructions are stored, when read by a computer, to cause the computer:

to receive code of the target application;

to perform first modifications to the code so as to generate a recorder version of the target application;

to perform second modifications to the code so as to generate a viewer version of the target application;

to intercept, by the recorder version of the target application, requests and responses made by the target application to detect, executing the recorder version of the target application, a set of first requests submitted by the recorder version of the target application and respective responses to the first requests, to store the set of first requests and the respective responses to a file; and upon detecting, executing the viewer version of the target application, a second request submitted by the viewer version of the target application matching a given first request in the set, to retrieve, from the file, a respective response to the given first request, and to convey, in response to the second request, the retrieved response to the viewer version of the target application.

* * * * *